US008222520B2

(12) United States Patent
Bremnes

(10) Patent No.: US 8,222,520 B2
(45) Date of Patent: Jul. 17, 2012

(54) ELECTRIC THREE-PHASE POWER CABLE SYSTEM

(75) Inventor: Jarle Jansen Bremnes, Fredrikstad (NO)

(73) Assignee: Nexans, Paris (FR)

( * ) Notice: Subject to any disclaimer, the term of this patent is extended or adjusted under 35 U.S.C. 154(b) by 708 days.

(21) Appl. No.: 12/313,781

(22) Filed: Nov. 24, 2008

(65) Prior Publication Data

US 2009/0205866 A1 Aug. 20, 2009

(30) Foreign Application Priority Data

Nov. 27, 2007 (NO) .................................. 20076091

(51) Int. Cl.
*H01B 11/02* (2006.01)
(52) U.S. Cl. .......................................................... 174/33
(58) Field of Classification Search ............... 174/27, 174/28, 29, 32, 33, 34, 36, 110 R, 113 R, 174/112
See application file for complete search history.

(56) References Cited

U.S. PATENT DOCUMENTS

| 1,804,478 | A | * | 5/1931 | Parker ............................ 138/112 |
| 3,694,563 | A | * | 9/1972 | Monds et al. .................... 174/97 |
| 4,086,427 | A | * | 4/1978 | Nasuta et al. ............... 174/88 C |
| 4,117,259 | A | * | 9/1978 | Giebel et al. ..................... 174/92 |
| 4,346,258 | A | * | 8/1982 | Kunze .............................. 174/93 |
| 5,027,478 | A | * | 7/1991 | Suhr ............................. 24/16 R |
| 5,036,891 | A | * | 8/1991 | Vogelsang ..................... 138/115 |
| 5,243,138 | A | * | 9/1993 | Guthke et al. ................. 174/146 |
| 5,703,330 | A | * | 12/1997 | Kujawski ..................... 174/72 A |
| 5,742,982 | A | * | 4/1998 | Dodd et al. .................... 24/16 R |
| 6,027,679 | A | * | 2/2000 | O'Brien et al. .......... 264/272.14 |
| 6,353,186 | B1 | * | 3/2002 | Dams et al. .................... 174/667 |
| 6,426,462 | B1 | * | 7/2002 | Mignon et al. ................. 174/651 |
| 6,506,971 | B1 | * | 1/2003 | Grach et al. ..................... 174/32 |
| 6,734,364 | B2 | * | 5/2004 | Price et al. ................. 174/117 F |
| 2003/0074878 | A1 | | 4/2003 | Mellott ............................. 57/10 |
| 2006/0193698 | A1 | | 8/2006 | Mjelstad et al. ........... 405/195.1 |

FOREIGN PATENT DOCUMENTS

DE 102004046964 3/2006
RU 202514 12/1994

* cited by examiner

*Primary Examiner* — William Mayo, III

(74) *Attorney, Agent, or Firm* — Sofer & Haroun, LLP

(57) ABSTRACT

Electric three-phase power cable system, include a number of individual single-core cables (1-6) extending in parallel. There is provided supporting means (40) for keeping six single-core cables (1-6) along at least a part of their length, in a substantially regular hexagonal configuration as seen in cross-section, and means (30) for feeding current in parallel and with equal distribution to respective diametrically opposite cable conductive cores (1/4, 2/5, 3/6).

9 Claims, 2 Drawing Sheets

ELECTRIC THREE-PHASE POWER CABLE SYSTEM

RELATED APPLICATION

This application claims the benefit of priority from Norwegian Patent Application No. 2007 6091, filed on Nov. 27, 2007, the entirety of which is incorporated by reference.

FIELD OF THE INVENTION

This invention relates to an electric three-phase power cable system in which electromagnetic field (EMF) exposure in the vicinity of the cables is reduced.

In the cable system contemplated here single-core, i.e. single-phase individual cables are used, as is common in many cases of underground or buried cable connections for the transfer of electric power, possibly at high voltages.

It is also to be noted that it may not always be necessary to avoid electromagnetic exposure along all the length of a power cable system. In many instances it will be sufficient to arrange for shielding of certain parts of a cable system, being of special high risk to the surroundings (people).

BACKGROUND

It is well known that in three-phase single-core cable circuits, the EMF will be kept to a minimum when the cables are placed in a trefoil configuration, in contrast to a flat configuration, which is much less favourable. A reduction of the inter-phase distance will also reduce the EMF, but thermal conditions will usually limit this distance to some minimum value.

As acceptable EMF exposure levels have decreased dramatically in many countries, it is often necessary to apply a passive EMF shield encompassing the trefoil cable arrangement for high-current electric power circuits. Such EMF shields will normally be composed of vertically and horizontally oriented steel, copper or aluminium plates. An example of such a shielding method is found in WO 2004/034539.

An alternative to the plate shielding referred to above, could be to apply massive metallic screens on the single-core cables. For three-phase cables this has been described in WO 99/44208 where a braided sheath or screen surrounds the electric power conductors so as to provide a shielding effect. Significant screen currents may be induced in particular with the first alternative referred to, thus necessitating a large screen cross-section so as to limit the additional power loss that might be a result of the screen current.

Another known proposal employs a six-phase system and six single-core cables. This solution (Brakelmann: Elektrizitätswirtschaft, year 94 (1995), No. 15, EMV-Massnahmen für Drehstrom-Einleiterkabel) requires special transformers at both ends of the (shielded) cable circuit to produce a symmetric six-phase system.

Both the use of massive metallic screens and the use of metallic plate shields are costly and will introduce additional power losses. Furthermore, the function of plate shields is dependent upon a stable geometry and of course durability of the metallic plates. The shielding effect may be reduced over time in case of corrosion and/or soil shifting, that may lead to detrimental cracks or grooves in the plate material.

Reference is further made to U.S. Pat. No. 6,506,971 describing various conductor arrangements in multi-core cables, but these are not directed to three-phase single-core cables in a system of the type contemplated here. Similar comments apply to Russian patent publication RU2025014.

OBJECTS AND SUMMARY

On the above background the present invention thus relates to an electric three-phase cable system comprising a number of individual single-core cables extending in parallel, and supporting means for keeping six single-core cables along at least a part of their length, in a substantially regular hexagonal configuration as seen in cross-section, and means for feeding current in parallel and with equal distribution to respective diametrically opposite cable conductive cores, the novel and specific features of which are set out in the claims. What is of particular importance in this connection, is that said supporting means comprise an assembly of elongate, rigid duct elements, each duct element having at least one channel extending along the whole length of the element and containing one of the single-core cables, said duct elements being preferably closely assembled in a mutually supporting and fixed manner.

BRIEF DESCRIPTION OF THE DRAWINGS

For further understanding of this invention and its advantages reference is now made to the following description and accompanying drawings, of which.

DETAILED DESCRIPTION

Figure 1:
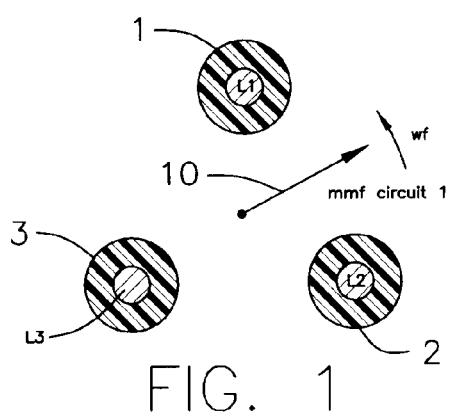
FIGS. 1, 2 and 3 are schematic cross-sections of three-phase structures with single-core cables, for explaining the fundamental relationships behind the invention.
Figure 2:
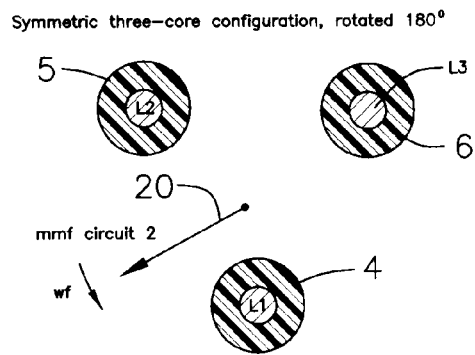

The three-phase structure in FIG. 1 consists of three conductors 1,2 and 3 in a symmetric three-core configuration (trefoil). There is also indicated a rotating magnetic vector 10 that will be present in such a three-phase system under operation. FIG. 2 shows a similar symmetric three-core configuration with conductors 4,5 and 6, this configuration being quite similar to one in FIG. 1, but with a rotation of 180 degrees in relation thereto. Accordingly the magnetic vector 20 of FIG. 2 will be directly opposed to vector 10 in FIG. 1.

Figure 3:
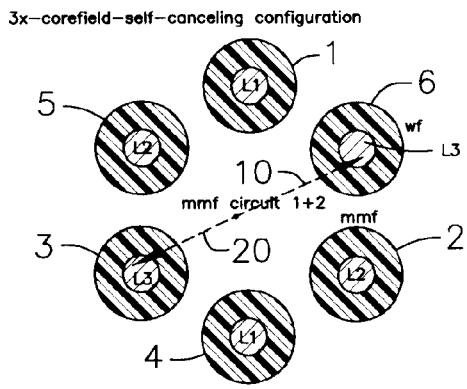

Then in FIG. 3, the six cables of FIGS. 1 and 2 have been brought together in a six-core, hexagonal configuration, in which the magnetic vectors 10 and 20 cancel mutually, thus forming a self-cancelling configuration, i.e. there is obtained an active EMF shielding as opposed to passive shielding by means of plates etc. as described above.

Figure 4:
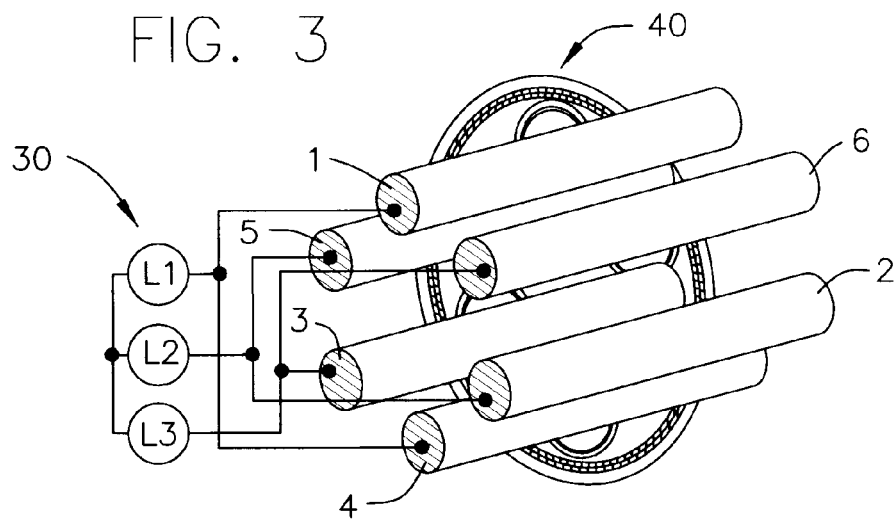
FIG. 4 is a schematic and partly isometric illustration of an electric three-phase power cable system according to the invention.

For a somewhat more practical three-phase power cable system, FIG. 4 illustrates six cables 1-6 in the same fundamental configuration as in FIG. 3, with generating means 30 connected to the different cable conductors 1-6 in order to achieve the self-cancelling effect as explained in relation to FIG. 3. Thus, pairs of diametrically opposite conductors in FIG. 4, such as 1-4, 2-5 and 3-6, respectively, are connected in parallel and with equal distribution of the current between all cable conductors. Very schematically in FIG. 4 there is shown at 40 a form of supporting or positioning means for keeping the cables in a substantially regular hexagonal configuration as seen in cross-section.

Figures 5, 6, 7:
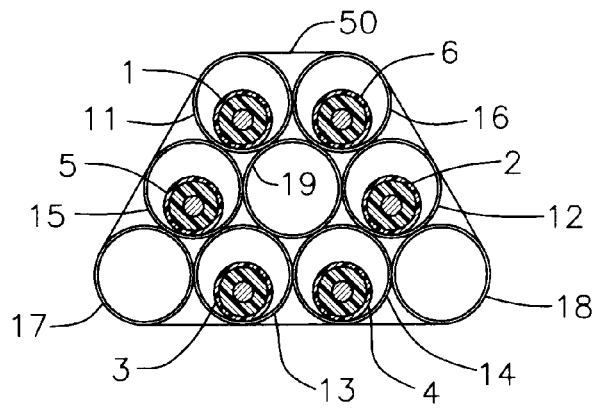
FIG. 5 is a cross-section of one embodiment according to the invention, based on tubes as rigid supporting means.
FIG. 6 is another embodiment base on tubes, and FIG. 7 in cross-section shows a further embodiment with concrete slabs as rigid supporting means.

A symmetric six-core geometry as explained in principle above, can be established by several possible installation or burial methods, with variants of supporting or positioning means for fixing the cables in the correct substantially hexagonal configuration. In FIG. 5 there is an embodiment with cables 1-6 being laid in respective tubes 11-16, with additional tubes 17 and 18 so as to form a stable supporting structure, as well as a central tube 19 as illustrated. By means of such a structure of nine tubes, a very advantageous geometrical cross-sectional pattern is obtained without any auxiliary members for defining the cross-sectional pattern. The tubes 11-16, 17, 18 and 19 as assembled will all have their "natural" and well defined position in the cross-section. For keeping the bundle of FIG. 5 together, it may be practical to have some kind of band or tape 50 wound around the bundle, preferably at regular intervals.

An assembly of nine tubes or ducts will typically be placed inside a common cable ditch and the respective cables can be pulled into the tubes by any conventional means. These tubes or ducts can for example be made of PVC or PE. As explained in connection with FIG. 4 pairs of diametrically opposite single-core cables in the tube bundle will share the current belonging to one electric phase. As a result there will be a significantly reduced EMF as compared to a trefoil configuration (FIG. 1 or FIG. 2) having the same current load.

The embodiment of FIG. 6 is quite similar to the one in FIG. 5 as far as the hexagonal configuration is concerned. However, in FIG. 6 there are only six tubes 21-26 each containing one of the cables 1-6. A central profile element 29 is provided here so as to ensure a stable geometry, and for this purpose there are also applied straps 60 around the assembly of tubes 21-26. In this embodiment the tubes have longitudinal slots as shown at 21S and 22S for tubes 21 and 22, respectively. When using such slotted tubes 21-26 it will be more easy in most instances, to insert the respective cables, than in the embodiment of FIG. 5. The possible filling of the tubes upon installation of the cables, with some suitable compound, would also be facilitated. Such filling or compound may be of interest in both embodiments of FIGS. 5 and 6 in order to stabilize the cables in position in the respective tubes, and possibly also for protection and better heat dissipation properties. As will be seen from FIG. 6, the slots 21S and 22S are somewhat narrower than the cable dimensions, whereby the cross-section of these tubes should be somewhat elastically deformable, so that during insertion of the cables the slots can be expanded.

Turning now to FIG. 7, there is illustrated a further embodiment wherein the supporting duct elements are in the form of substantially flat concrete slabs 31,32,33 laid on top of each other, i.e. with a bottom slab 31 an intermediate slab 32 and a top slab 33. To keep the slabs in correct position mutually, there may be some sort of locking or positioning means as shown at 51 and 52 between slabs 31 and 32, and at 53 between slabs 32 and 33.

In this embodiment each slab is provided with two channels, such as channels 41 and 46 for cables 1 and 6 in slab 33. The embodiment in FIG. 7 as well as those illustrated in FIGS. 5 and 6 have the cables 1-6 positioned in three separate horizontal levels, as indicated at I, II and III in FIG. 7, with two cables in each level. With such an orientation of the hexagonal configuration there will be advantages in many instances, among other things with respect to the overall depth dimension of the assembly. The embodiment of FIG. 7 can be adapted to any inter-phase distance, and if necessary would make it easy to attach additional passive or conventional plate shields to the surfaces of the assembly.

As in the embodiments of FIGS. 5 and 6 the one in FIG. 7 may also comprise a filling material or compound around the cables in their channels or ducts, which is illustrated at 70 around and covering cables 3, 4 and 5 in FIG. 7. In the case of concrete slabs as in FIG. 7, the filling material 70 may also be a suitable type of concrete. In the case of tubes as in FIGS. 5 and 6, such filling will be in the form of other materials or compounds, in certain instances compounds of a type that can be removed from the tubes if necessary.

The invention claimed is:

1. Electric three-phase power cable system, comprising:
 a number of individual single-core cables extending in parallel;
 supporting means for keeping six single-core cables along at least a part of their length, in a substantially regular hexagonal configuration as seen in cross-section; and
 means for feeding current in parallel and with equal distribution to respective diametrically opposite cable conductive cores, wherein said supporting means includes an assembly of elongate, rigid duct elements, each duct element having at least one channel extending along the whole length of the element and containing one of the single-core cables, said duct elements being closely assembled in a mutually supporting and fixed manner.

2. Cable system according to claim 1, wherein said duct elements are in the form of tubes.

3. Cable system according to claim 2, wherein said tubes are arranged in a bundle containing nine tubes, of which one tube is a central tube not containing any cable.

4. Cable system according to claim 2, wherein a central profile element is provided, for keeping the tubes in said substantially regular hexagonal configuration.

5. Cable system according to claim 2, wherein the tubes have a slot along their length, with an elastically deformable cross-section of the tubes, so as to facilitate entry of the cable into each tube.

6. Cable system according to claim 1, wherein said duct elements are in the form of substantially flat slabs made of concrete, each slab being provided with two channels for one cable each.

7. Cable system according to claim 6, wherein the concrete slabs are provided with locking means for keeping the slabs assembled in correct positions.

8. Cable system according to claim 1, wherein said channels are filled with a heat conductive compound covering and stabilizing the cable in each channel.

9. Cable system according to claim 1, wherein the cables are positioned in three separate horizontal levels, with two cables in each level.

* * * * *